May 12, 1964 W. M. ELLINGSWORTH, JR., ETAL 3,132,826
CAM CONTROLLED VALVE
Filed Jan. 29, 1962
3 Sheets-Sheet 1

INVENTORS.
WALTON M. ELLINGSWORTH, JR.
QUENTIN B. FARMER
BY
George C. Sullivan
Agent May 12, 1964 W. M. ELLINGSWORTH, JR., ETAL 3,132,826
CAM CONTROLLED VALVE
Filed Jan. 29, 1962 3 Sheets-Sheet 3

INVENTORS.
WALTON M. ELLINGSWORTH, JR.
QUENTIN B. FARMER
BY
*George C. Sullivan*
Agent

United States Patent Office 3,132,826
Patented May 12, 1964

3,132,826
CAM CONTROLLED VALVE
Walton M. Ellingsworth, Jr., Atlanta, and Quentin B. Farmer, Austell, Ga., assignors to Lockheed Aircraft Corporation, Burbank, Calif.
Filed Jan. 29, 1962, Ser. No. 169,244
2 Claims. (Cl. 244—42)

This invention relates to controlling a blowing or boundary layer airflow over a control surface, and more particularly to an arrangement for selectively varying the amount of air supplied to a boundary layer control system as a function of the position of a control surface.

It is known that employment of a positive efflux or blowing of a boundary layer airflow over the top surface of a high lift device movable relative to a fixed airfoil, such as flaps, when extended, results in increased aerodynamic lift. This increased lift is accomplished due to such effects as: (1) the lift curve slope of the airfoil is increased to near the full theoretical values; (2) boundary layer separation of the airfoil is prevented at speeds up to and in excess of the maximum takeoff and landing speeds; (3) the vertical component of the jet reaction increases the lift directly; and (4) the phenomenon of super circulation, or pressure lift increases the lift, such being accomplished due to the result of pressure discontinuity at the trailing edge of the flap.

The increased lift due to wing flaps through the above effects permits the aircraft to fly at substantially lower speeds. The reduced speed of the aircraft when the flaps are extended in turn causes a compatible reduction of air speed over conventional control surfaces, such as the rudder, elevators, etc., and hence, a consequent reduction in the effectiveness of such control surfaces. By supplying a blowing airflow over conventional control surfaces during low speed conditions, control effectiveness of the aircraft can be increased as well as can large control surface deflections be permitted without loss of aircraft control effectiveness. Furthermore, the above advantages can be further enhanced by selectively varying the air supplied to a boundary layer air control system as a direct function of predetermined deflections of the control surface.

Accordingly, it is an object of this invention to provide increased control effectiveness of aircraft movable control surfaces by selectively varying the amount of air supplied to a boundary layer control system therefor as a function of the displacement of the control surface.

Another object of this invention is to provide a control arrangement for selectively varying the amount of air supplied to a boundary layer control system as a direct function of the position of a control member, including cam means connected to the control member for selectively varying the opening of a control valve in the boundary layer control system.

Another object of this invention is to provide an air valve and cam controlling mechanism for selectively actuating the valve.

Other objects and advantages will become apparent from the following description taken in conjunction with the accompanying drawings in which.

Generally stated, the invention comprises a movable aircraft control surface interconnected to a valve in a boundary layer control system supplying a blowing airflow to the control surface, the interconnection of the control surface to the valve arranged to control the valve, and hence the airflow over the control surface, as a function of the position of the control surface.

Figure 1:
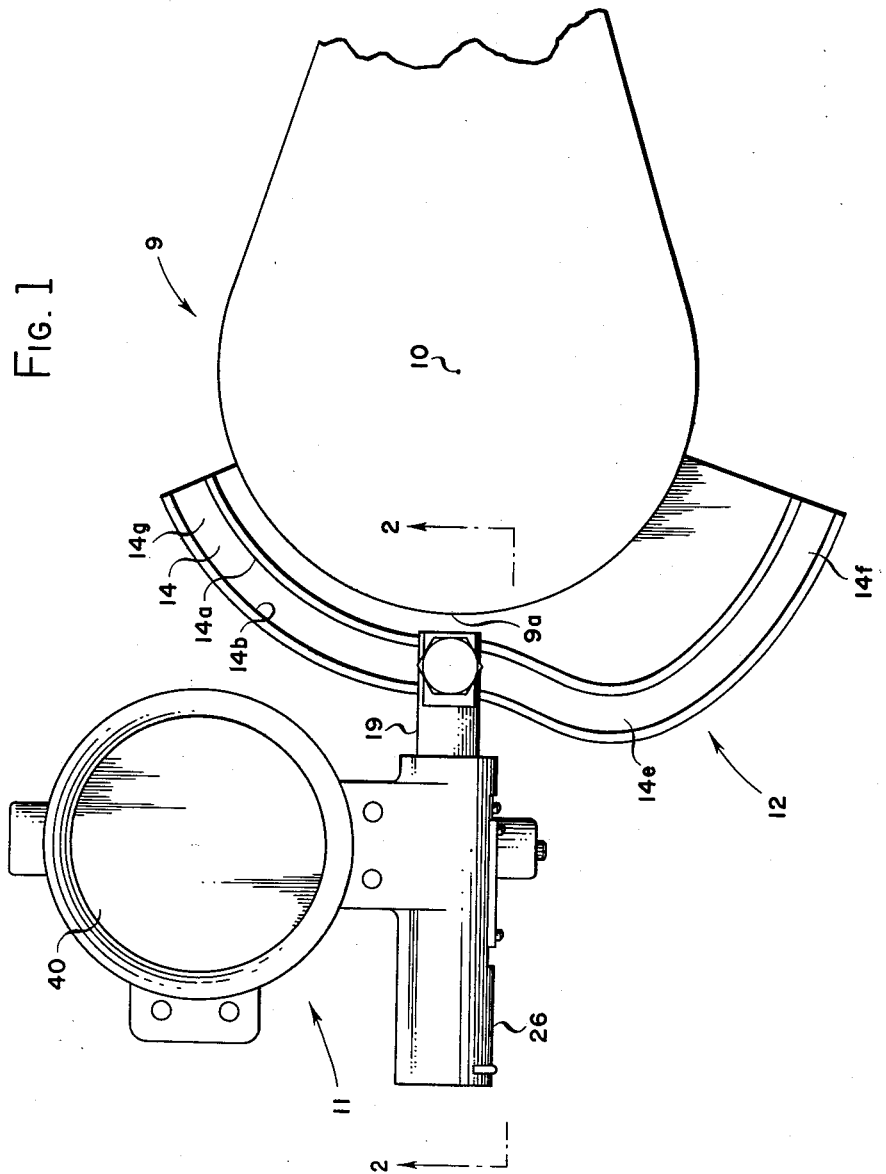
FIGURE 1 is a side view of a movable aircraft control surface operatively connected to a blowing airflow control valve, the opening of which is controlled by the position of the control surface.

More specifically there is shown in FIGURE 1, a control surface 9 pivotable about an axis 10 and operatively connected to a control valve 11 mounted proximate control surface 9 by any appropriate mounting means (not shown).

Figure 2:
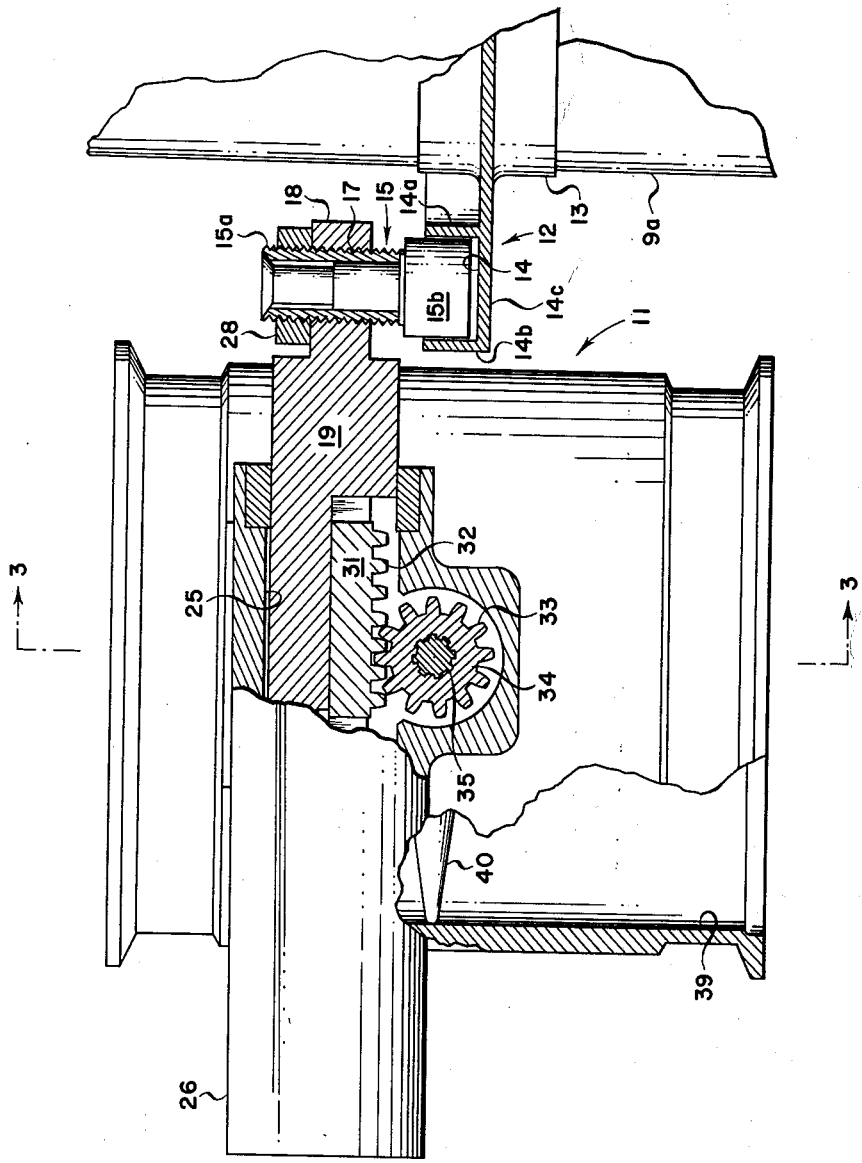
FIGURE 2 is a top view of the control surface and valve shown in FIGURE 1, the valve and interconnecting members to the control surface being partially cross-sectioned.

A cam 12 member having a curved base 13 is connected or mounted to the face 9a of control surface 9, as can be seen in FIGURES 1 and 2, the curvature of base 13 being substantially identical to the shape of leading edge 9a. The major portion of cam member 12 extends perpendicularly from base 13 and is provided with a U-shaped cam track 14 formed by sidewalls or cam surfaces 14a, 14b and bottom 14c. The depicted cam track 14 is designed to have a constant radius arcuate portion at 14g, a short varying radius arcuate portion at 14e and a constant radius arcuate portion at 14f, each with respect to axis 10 of the control surface 9.

A cam follower 15 has a rotatable, circular end portion 15b which is mounted for operative engagement with cam track 14 and a threaded shank portion 15a. The shank 15a is threadably received in a threaded bore 17 formed in the end 18 of a reciprocating slide bar 19, which is mounted within a slide chamber 25 formed in the housing 26 of control valve 11. A nut 28 is threadably received upon the threaded shank 15a of cam follower 15 in abutment with the end of slide bar 19 to lockingly connect the cam follower 15 to the slide bar 19 and to position cam follower end portion 15b within the cam track 14. Slide bar 19 is provided centrally thereof with a cutout for mounting a rack 31 having a plurality of teeth 32 therein.

Figure 3:
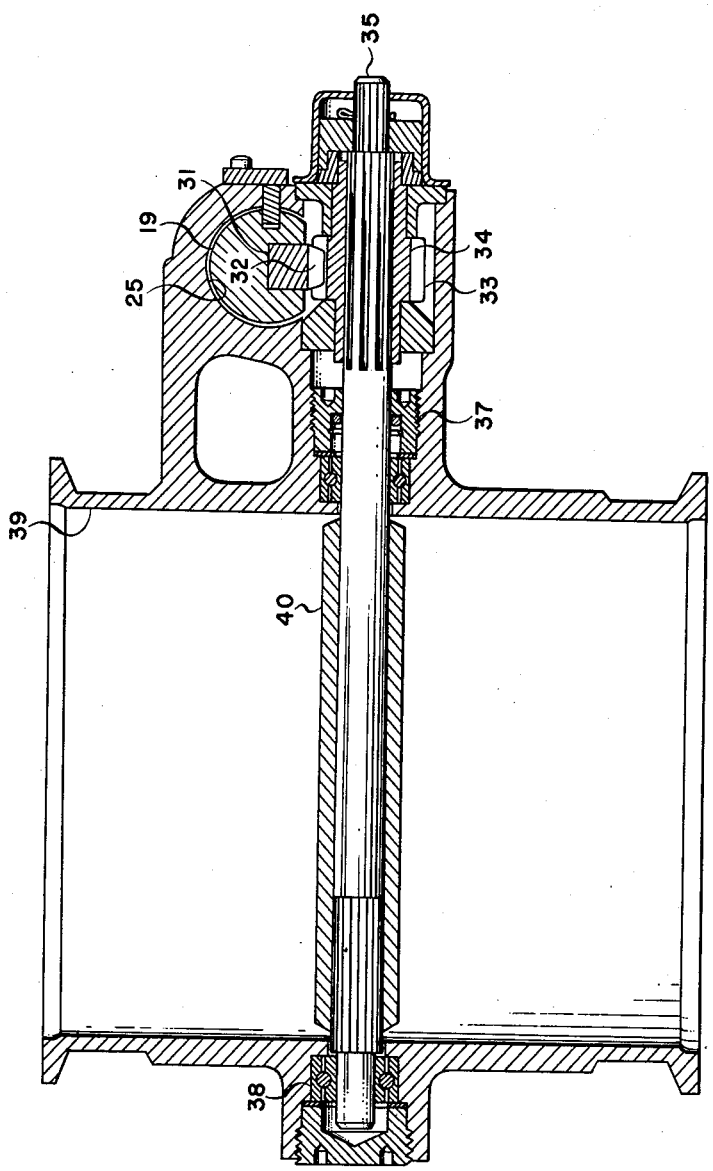
FIGURE 3 is a cross-sectional view taken along line 3—3 of FIGURE 2.

The teeth 32 of the rack matingly engage the teeth 33 of pinion gear 34 splined onto the end of a shaft 35 which is perpendicularly related to the rack 31. Shaft 35 is rotatably mounted within housing 26 on spaced bearings 37 and 38, which can best be seen in FIGURE 3. The housing 26 includes an integrally formed flow passage 39. The shaft 35 intersects the flow passage 39 on a diametral line and mounts a butterfly valve element 40 within the flow passage. The opposed ends of the flow passage 39 formed by housing 26 are adapted to be secured to mating flow passage means of a boundary layer control system for the control surface 9 by suitable U-shaped clamps.

In operation, and when the control surface 9 is in the position it assumes in level flight, as shown in FIGURE 1, the butterfly valve element 40 will be closed. If control surface 9 is rotated counterclockwise from the position shown in FIGURE 1, the cam follower 15 follows the arcuate portion 14g of cam track 14. As the cam track arcuate portion 14g has a constant radius with respect to axis 10, the slide bar 19 remains stationary and valve element 40 remains closed. On the other hand, if the control surface 9 is rotated clockwise from the position shown in FIGURE 1, the cam follower 15 follows the cam track arcuate portion 14e. As the cam track arcuate portion 14e has a rapidly varying radius with respect to axis 10, the slide bar is moved inwardly into slide chamber 25, thus rotating shaft 35 through the interaction of rack 31 and pinion 34, thereby opening valve element 40. Air is then allowed to pass control valve 11. Upon further clockwise rotation of control surface 9, the cam follower 15 follows the cam track arcuate portion 14f.

As the arcuate portion 14f has a constant radius with respect to axis 10, no further valve opening is effected.

It is to be further understood that the position of valve 11 controlled by the depicted cam track 14 may be changed or programmed as desired by any appropriate design configuration of cam track 14. In other words, by appropriate design of cam track 14 the butterfly valve element 40 may be opened when control surface 9 is moved in either direction from its neutral position as shown in FIGURE 1, as well as have a different opening rate when control surface 9 is moved in one direction from neutral relative to the other direction from neutral. Likewise, the opening of valve element 40 may be delayed until a certain amount of predetermined deflection from neutral position of control surface 9 is obtained, as well as the opening or closure of valve element 40 can be reversed so that, when control surface 9 is in a neutral position as shown in FIGURE 1, the valve element 40 may be open with closure being effected by rotation of control surface 9 from neutral. Furthermore, this arrangement could be applied to a control surface 9 that moves in only one direction from neutral, such as a flap, as well as the opening or closure of the valve element 40 could be programmed for only a portion of the total displaceable range of the control surface 9 from neutral.

It will be appreciated by one skilled in the art from the foregoing that this invention provides a new and novel arrangement for positively controlling a controlled member over a predetermined program by a rotatable control surface by the use of a cam connected to a control surface.

While a particular embodiment of the invention has been illustrated and described, it will be obvious to those skilled in the art that various changes and modifications may be made without departing from the invention and it is intended to cover in the appended claims all such modifications and equivalents as fall within the true spirit and scope of this invention.

What is claimed is:
1. In combination:
a pivotable airfoil control surface;
a cam having a programmed cam track mounted on the exterior surface of said control surface perpendicular to the pivotal axis of said control surface;
a cam follower having a roller portion;
a valve housing having a flow passage therethrough;
a butterfly valve mounted within said flow passage;
and a reciprocating actuator for opening and closing said butterfly valve,
said cam follower mounted on said reciprocating actuator with said roller portion thereof mounted in rolling engagement with at least one side edge of said cam track whereby predetermined pivotal movement of said control surface in either direction from neutral actuates said reciprocating actuator for selectively varying the opening and closing of said butterfly valve in accordance with the position of said control surface.

2. In combination:
a pivotable airfoil control surface having a leading edge disposed forwardly of the pivotal axis of said control surface;
a cam having a programmed cam track mounted on the exterior surface of said control surface leading edge perpendicular to the pivotal axis of said control surface;
a unitary valve housing having a flow passage therethrough for removable locking coupling engagement with a fluid flow passage in a fluid flow line;
a butterfly valve mounted in said valve housing flow passage;
a reciprocating actuator operatively connected to said butterfly valve for opening and closing said butterfly valve;
a threaded through hole in one end of said reciprocating actuator;
and a cam follower having a threaded shaft end and a roller on the other end thereof adjustably threadably mounted with its threaded shaft end within the threaded hole in said reciprocating actuator whereby said cam follower roller thereof is engaged with said cam track whereby predetermined pivotal movement of said control surface in either direction from neutral reciprocatingly actuates said reciprocating actuator for selectively varying the opening of said butterfly valve in accordance with the position of said control surface.

References Cited in the file of this patent
UNITED STATES PATENTS

| | | |
|---|---|---|
| 304,936 | Jones | Sept. 9, 1884 |
| 1,559,962 | Heinitz | Nov. 3, 1925 |
| 2,478,793 | Trey | Aug. 9, 1949 |
| 2,969,206 | Jensen | Jan. 24, 1961 |
| 2,974,904 | Fielding | Mar. 14, 1961 |